US012002331B2

(12) United States Patent
Miller

(10) Patent No.: US 12,002,331 B2
(45) **Date of Patent: *Jun. 4, 2024**

(54) POINT AND/OR MONEY BASED FANTASY GAMING

(71) Applicant: CFPH, LLC, New York, NY (US)

(72) Inventor: Kenneth Miller, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,321

(22) Filed: Jan. 20, 2023

(65) Prior Publication Data

US 2023/0162572 A1 May 25, 2023

Related U.S. Application Data

(63) Continuation of application No. 17/306,861, filed on May 3, 2021, now Pat. No. 11,562,629.

(51) Int. Cl.
*G07F 17/32* (2006.01)

(52) U.S. Cl.
CPC ...... *G07F 17/3288* (2013.01); *G07F 17/3244* (2013.01)

(58) Field of Classification Search
CPC ......................... G07F 17/3288; G07F 17/3244
See application file for complete search history.

(56) References Cited

U.S. PATENT DOCUMENTS

| | | | | |
|---|---|---|---|---|
| 6,688,978 | B1 * | 2/2004 | Herman | A63F 3/081 700/91 |
| 8,814,664 | B2 * | 8/2014 | Amaitis | A63F 9/24 463/25 |
| 2004/0266530 | A1 * | 12/2004 | Bishop | A63F 13/63 463/42 |
| 2005/0181869 | A1 * | 8/2005 | Downes P.E. | G07F 17/32 463/28 |
| 2008/0161113 | A1 * | 7/2008 | Hansen | A63F 13/335 463/42 |
| 2008/0254876 | A1 * | 10/2008 | Koustas | G07F 17/3272 463/28 |
| 2009/0023495 | A1 * | 1/2009 | Koustas | G07F 17/32 463/43 |
| 2009/0026706 | A1 * | 1/2009 | St. Clair | G06Q 50/34 700/91 |
| 2009/0203447 | A2 * | 8/2009 | Hansen | A63F 13/828 463/42 |
| 2010/0285857 | A1 * | 11/2010 | Anderson | G07F 17/32 463/9 |
| 2010/0311484 | A1 * | 12/2010 | Suh | G07F 17/3276 463/4 |
| 2013/0331967 | A1 * | 12/2013 | Amaitis | G07F 17/3293 700/92 |
| 2017/0256141 | A1 * | 9/2017 | Simons | G07F 17/3286 |
| 2021/0077909 | A1 * | 3/2021 | Butz | A63F 13/828 |
| 2021/0319653 | A1 * | 10/2021 | Isgar | G07F 17/3288 |

* cited by examiner

*Primary Examiner* — Steve Rowland

(57) ABSTRACT

Some examples may include a poker indexing service. For example, a multi-dimensional vector of player performance and/or other data may be determined based on gaming related activity that is input or otherwise captured. Such a vector may be used in various forms to generate a metric or to facilitate wagering and/or other gaming activity. Other methods and apparatus are described.

18 Claims, 6 Drawing Sheets

POINT AND/OR MONEY BASED FANTASY GAMING

CROSS REFERENCE TO RELATED APPLICATIONS

This application is a continuation of U.S. patent application Ser. No. 17/306,861 filed May 3, 2021, which is incorporated by reference herein in its entirety.

FIELD

Some examples may relate to sports wagering, casino wagering, event wagering, free play, subscription wagering services, point-based wagering, and so on.

BACKGROUND

Traditional wagering may involve risking an amount of money for the potential of winning a greater amount of money. The outcome of a wager may be based on the occurrence of an event.

DETAILED DESCRIPTION

Some examples may allow players to play games for non-monetary rewards and/or monetary rewards. Play of the game may require a risk or payment of some monetary amount and/or some element that may be obtained with a monetary value (e.g., a token, purchased points). A non-monetary reward may include an award of points that may not be redeemed for cash or other goods or services, a penalty applied to another player, and/or any other sort of non-monetary bonus or award as desired. A monetary reward may include a cash credit, a credit of something that may be exchange for cash and/or used to buy goods and/or services, and so on. A game may include a wagering game such as a sports wagering game, a casino wagering game, a multi-player game, a video game, a single player game, a lottery, and so on. Play of such a game may include risking some amount of monetary and/or non-monetary elements in hopes of obtaining some amount of monetary and/or non-monetary elements by winning the game.

Some examples may include wagering between a player and a house and/or wagering between two or more players. A house may set wagering parameters such as odds, amounts wagered, available wagers, and so on. Players may define wagering parameters, such as odds, amounts wagered, selected wagers, and so on. Some examples may include a social networking component that allows friends to wager with one another. For example, a proprietary social network may allow players to track friends in a gaming environment (e.g., by adding aliases, emails, names, etc. to a friend's list). Some examples may interface with another social network such as Facebook to allow players to wager with friends in that social network (e.g., through APIs, as a Facebook game).

Some examples may advantageously allow players to train in sports betting without some of the risk of traditional sports betting. Some examples may advantageously allow additional types of wagering that may not be available for monetary wagers. Some examples may advantageously provide a new form of entertainment to a group of friends.

Points Wagering Examples

Some examples may include risking an amount of non-monetary elements in a game. Such non-monetary elements may be referred to herein as points, but it should be recognized that some points may have monetary value, and that other things may not have monetary value, and so the name used to refer to such an element is not definitive.

Figure 1:
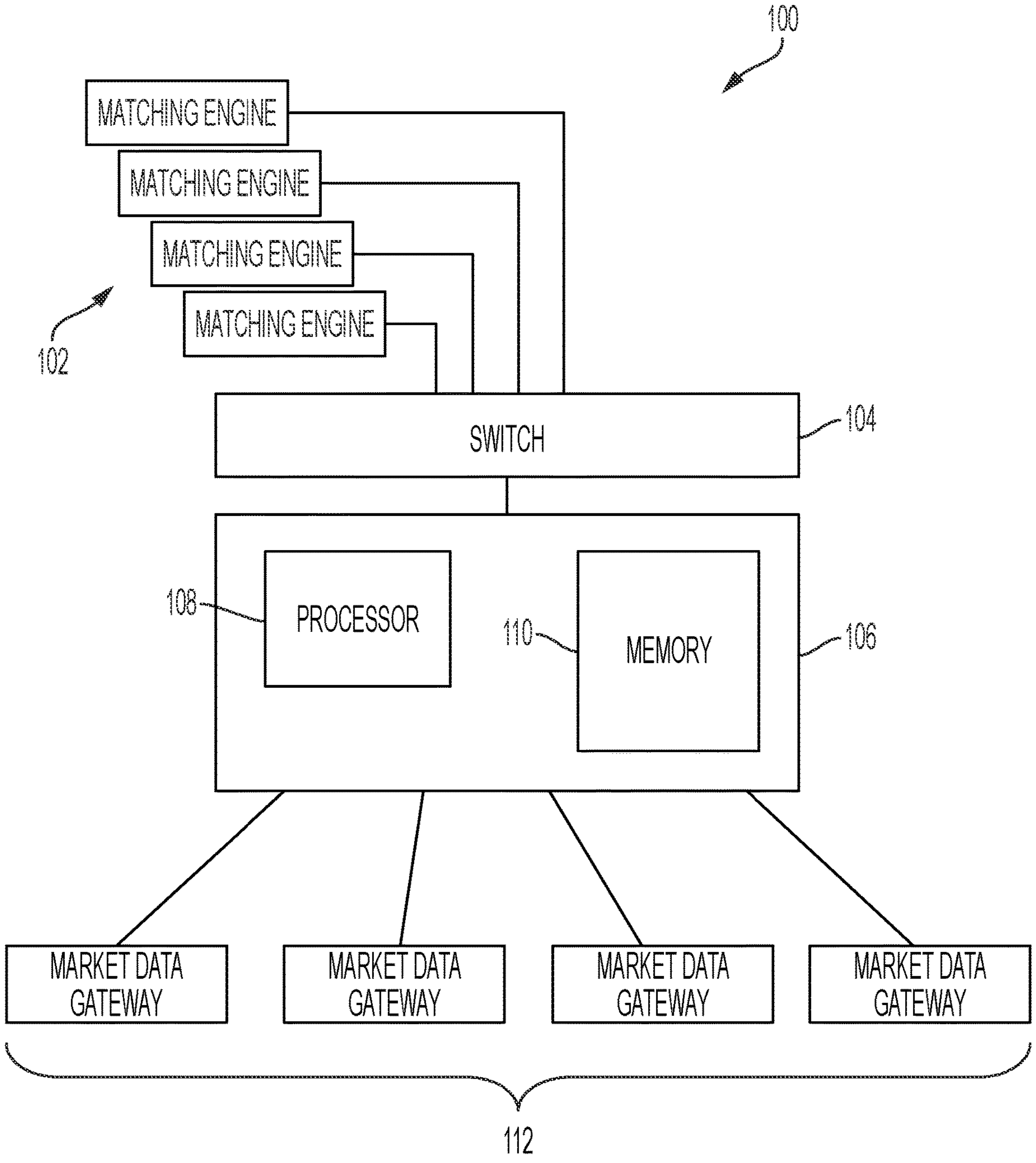
FIG. 1 shows an example method in accordance with aspects of the instant application.

FIG. 1 illustrates an example method that may be used in some examples involving points wagering. Some wagering may include a wager against a house. Some wagering may include a wager against another one or more players. Wagering may involve actions such as the actions of FIG. 1 performed by one or more computing devices, such as a gaming server operated by a gaming provider that provides gaming functionality to one or more players and/or devices.

Figure 2:
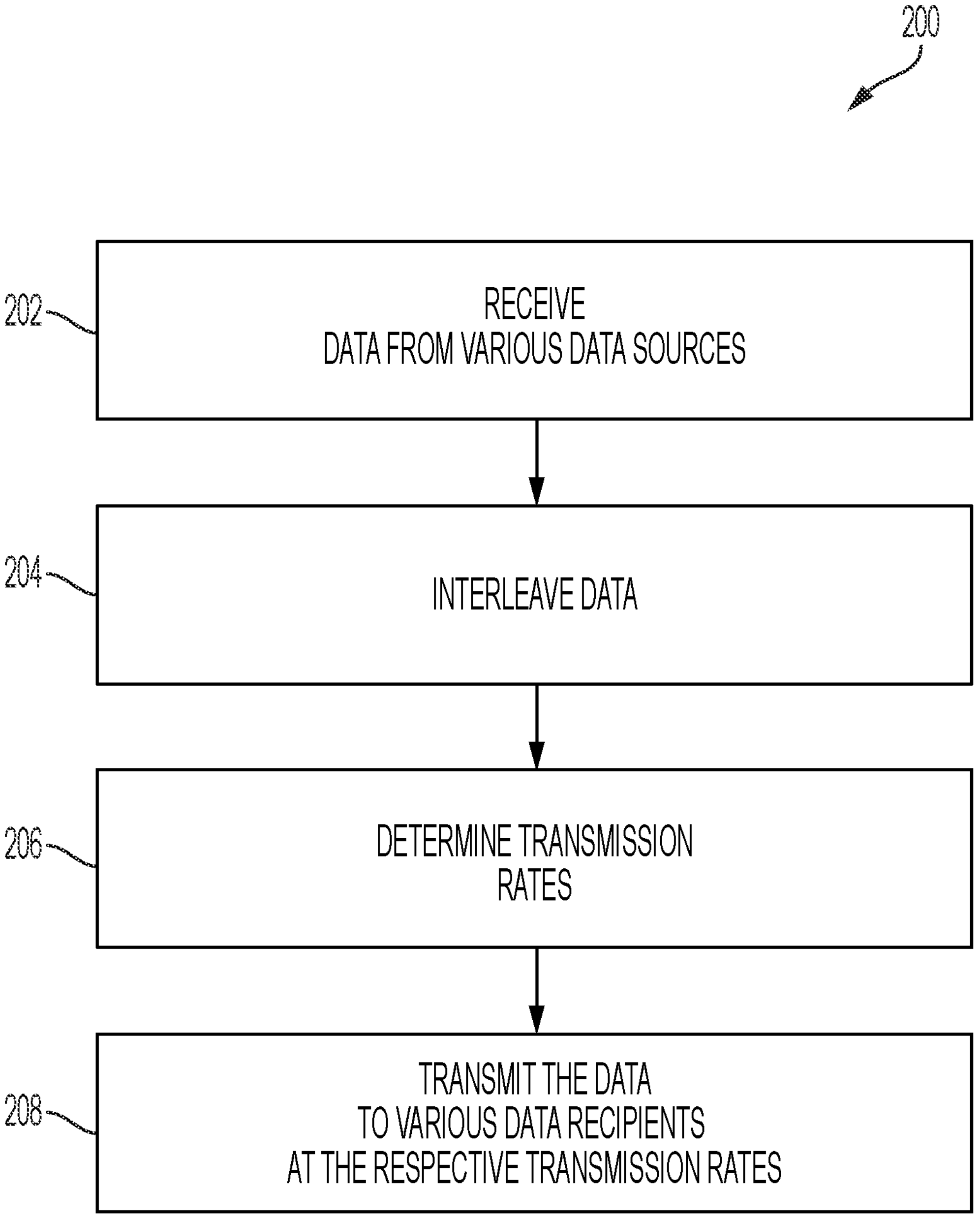
FIG. 2 shows an example interface in accordance with aspects of the instant application.

Some example may include providing an interface through which one or more users may wager points. FIG. 2 illustrates one such example interface. Such an interface maybe transmitted (e.g., from a gaming server) to users that access a gaming service. A user may operate controls of such an interface in order to explore offered wagers, view wager related information, view account information, manage wagers, manage accounts, enter into wagers, and so on. Controls may include, for example buttons (e.g., touch screen buttons, physical buttons, etc.) and or other controls that may be operated in any manner by a user.

As illustrated, various information about waging may be displayed in such an interface. For example, odds, bet requirements, bet characteristics, active bets, bet history, friends, and so on may be displayed. Such information may be determined by a gaming service (e.g., odds may be calculated based on historic data, based on expected outcomes of an event, and so on; game characteristics may be determined based on data about upcoming games such as who the participants in an upcoming football game will be or when the game will be held; requirements may be determined to meet gaming service rules such as a minimum amount of a bet and so on). It should be recognized that any information that may facilitate wagering may be displayed in such an interface and determined in any desired manner.

As illustrated in FIG. 2, some examples may include navigation controls that allow a user to select wager types and/or information types for display. A user may operate such controls (e.g., click/tap a button). In response to operation of such controls, information related to the controls (e.g., selected game types, selected information types, selected action) may be transmitted for display through such an interface.

As illustrated in FIG. 2, some examples may include wagering controls that may be operated by a user to enter a wager. Operation of the controls may be interpreted by a device through which the interface is being displayed. Information regarding the interpretation and/or operation of the control may be transmitted to a gaming service. For example, if a user clicks on a button to select to wager on an underdog in an Oakland vs North Dakota game then a request to place such a wager may be sent to a gaming service. Some examples may include steps such as confirmation or further data entry before and/or after such information is transmitted.

Figure 3:
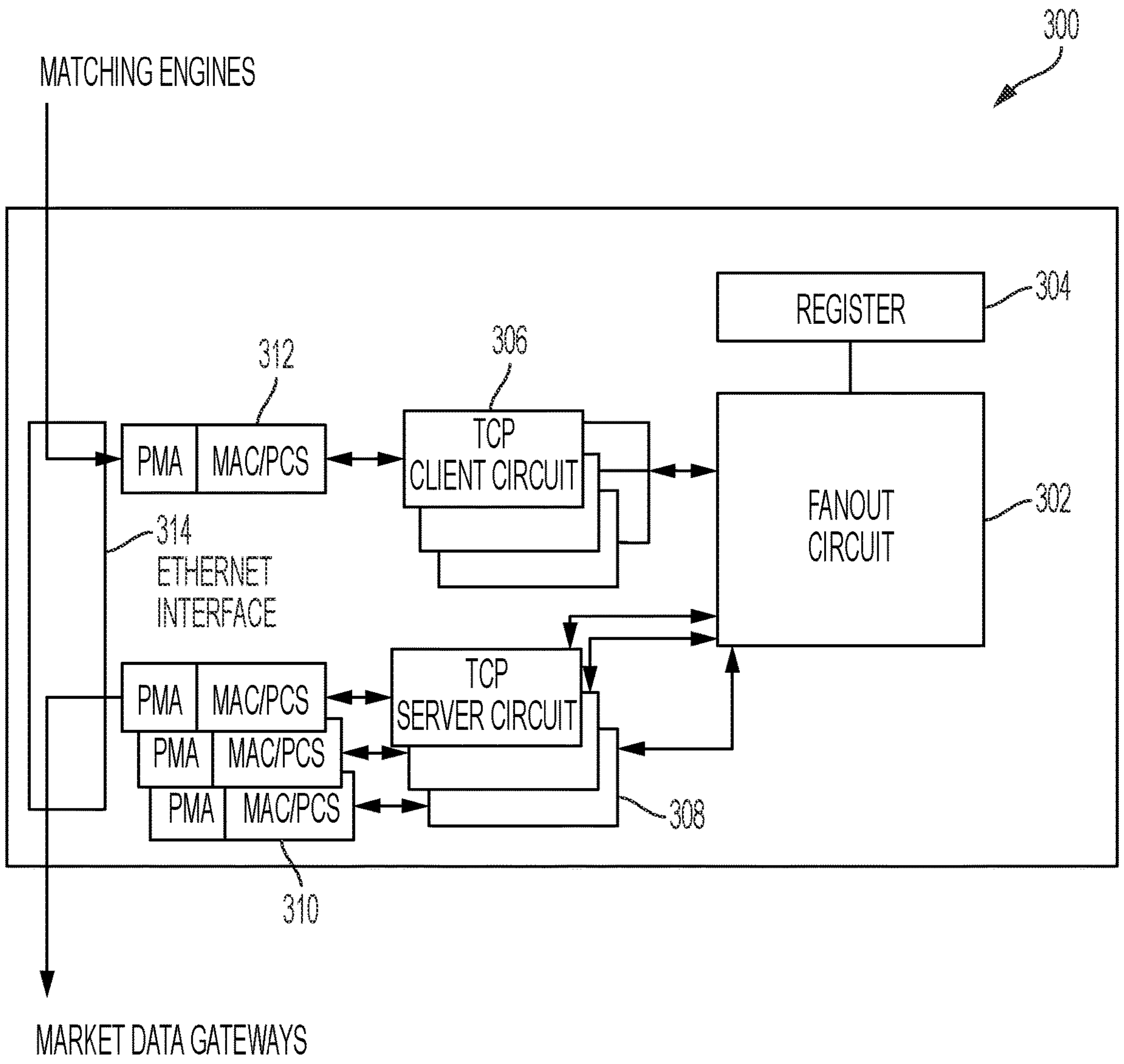
FIG. 3 shows an example interface in accordance with aspects of the instant application.

As illustrated in FIG. 3, some example may include one or more interfaces through which wager information may be entered and/or confirmed. For example, in the illustrated interface, a player may enter points to be wagered and shown an amount of points possibly won for winning the wager previously selected in the interface of FIG. 2. It should be recognized that any interfaces may be used to further define and/or refine and/or confirm any characteristics of a wager.

Some examples, as indicated at block 101 of FIG. 1, may include receiving information identifying characteristics of a wager. For example, a gaming server may receive information that identifies one or more parameters of a desired wager (e.g., an amount to points to be wagered, an event on which a wager is based, parameters that define a wager, opponent for a wager, and so on). Such information may be stored and/or processed so that a wager may be established defined by the parameters, history of wagers may be obtained, outcomes of wagers may be determined, and so on.

Wager Against a House Examples

Figure 4:
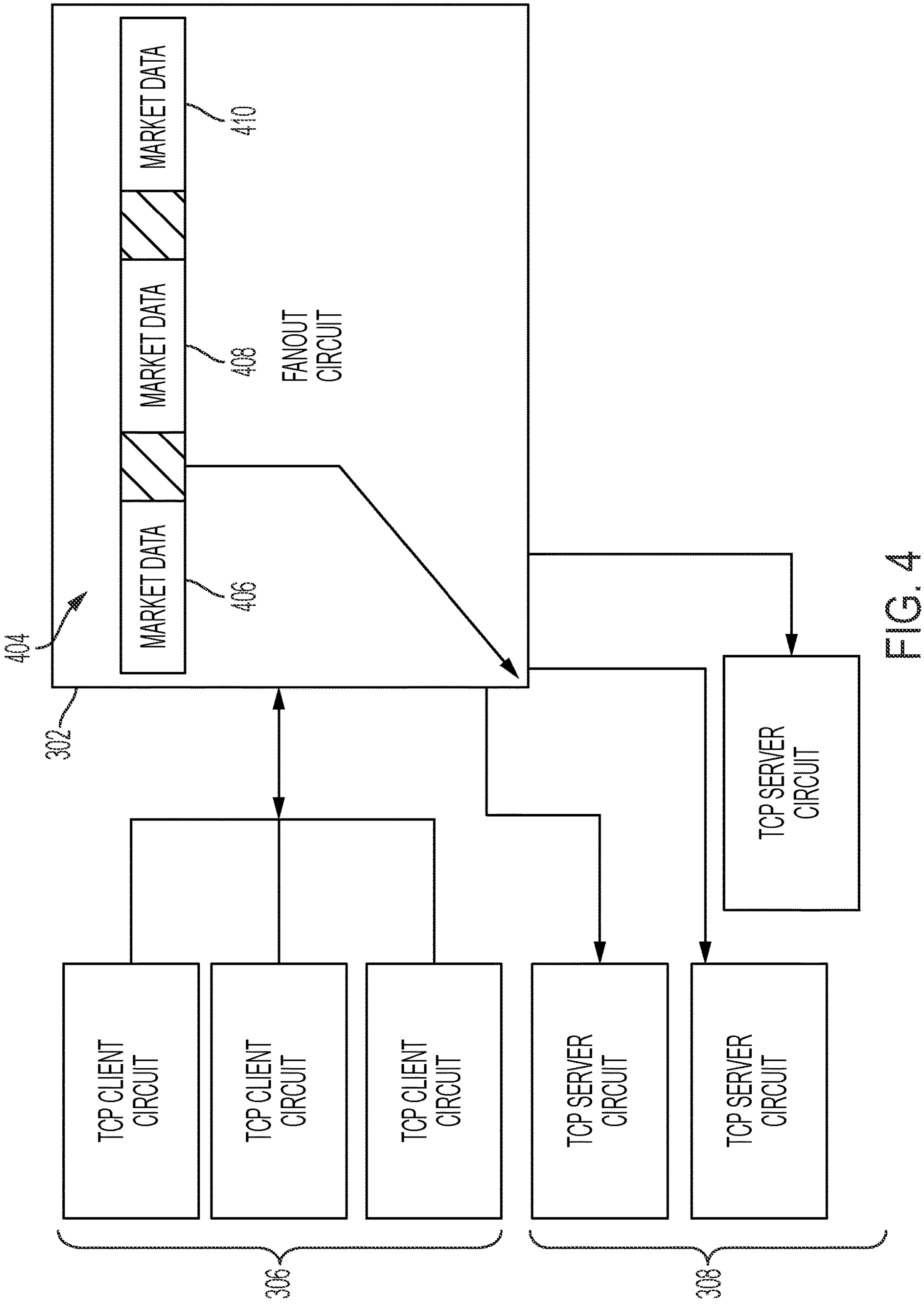
FIG. 4 shows an example interface in accordance with aspects of the instant application.

As illustrated in FIG. 4, some examples may include an interface through which a user may select an opponent for a wager. In some examples this may be inferred from a wagering option selected through a main interface (e.g., an interface of FIG. 2). In some examples the main interface may be used to select some characteristics of a wager (e.g., event, odds, etc.) that may apply to future selected opponents. The ordering of selected opponents, odds, sides, and amounts may be rearranged in any manner as desired through any interfaces.

Through an interface such as that of FIG. 4, a player may choose to place a wager of an amount of points against a house. For example, a player may select the house option and select the confirm control. Information about such an opponent may be submitted to a gaming service (e.g., transmitted from a mobile gaming device to a gaming server).

A gaming service (e.g., a gaming sever) may receive information defining an opponent to a wager (e.g., together with and/or separately from other information that may define a wager). The information may identify that the opponent for a wager is a house. A gaming server may determine an opponent for a wager based on that received information and may establish a wager and/or attempt to establish a wager in response. A house may automatically accept wagers entered in this manner. Up to some cut off or wager amount or whatever restriction is applied at the house.

Wagering Against Another Player Examples

As illustrated in FIG. 4, some examples may include an interface through which a user may select an opponent for a wager. In some examples this may be inferred from a wagering option selected through a main interface (e.g., an interface of FIG. 2). In some examples the main interface may be used to select some characteristics of a wager (e.g., event, odds, etc.) that may apply to future selected opponents. The ordering of selected opponents, odds, sides, and amounts may be rearranged in any manner as desired through any interfaces.

Through an interface such as that of FIG. 4, a player may choose to place a wager of an amount of points against another player. For example, a player may select the friend's option, select one or more friends, and select the confirm control. Information about such an opponent may be submitted to a gaming service (e.g., transmitted from a mobile gaming device to a gaming server). A listing of friends (e.g., people in a player's social network) may be displayed. The player may select one or more opponents from those friends. The listing of friends may be sorting in various manners that may be selected by a player. For example, a player may select to sort by name, by last played against, by most played against, and so on.

Some examples may include populating a listing of potential opponents. For example, such a listing may be populated based on friends of a player to include those friends of the player (e.g., people on a friend list or in a social network of the player). Some examples may include filtering one or more people out of such a list of potential opponents. For example, if a potential opponent does not have enough points to make a wager (e.g., has fewer points than the wager is for) then the player may not be shown in the list.

A gaming service (e.g., a gaming sever) may receive information defining an opponent to a wager (e.g., together with and/or separately from other information that may define a wager). The information may identify that the opponent for a wager is a house. A gaming server may determine an opponent for a wager based on that received information and may establish a wager and/or attempt to establish a wager in response. For example, as illustrated at block 103, some examples may include receiving an identification of another player as an opponent for a wager.

Figure 5:
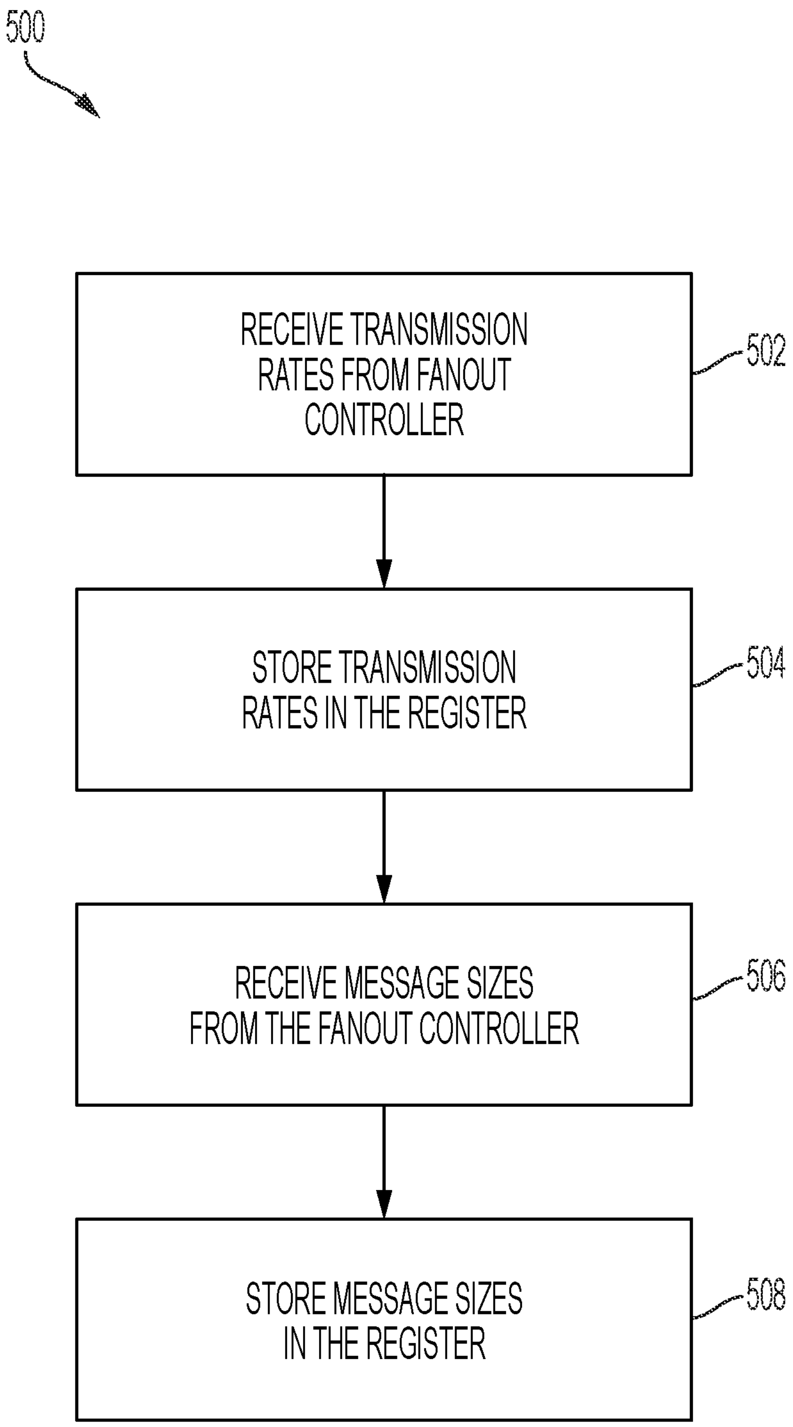
FIG. 5 shows an example interface in accordance with aspects of the instant application.

A wager against another player may be referred to as a challenge. The other player may be offered the challenge through an interface. For example, FIG. 5 illustrates a challenged player a list of incoming challenges. A challenged player may be shown information identifying challenges made to the challenged player by other players. The challenges may be ordered in any desired manner that may or may not be selected by the challenged player (e.g., time received, player name, etc.). Through such an interface, a player may accept or decline any number of challenges by operating a control.

As indicated at block 105, some examples may include soliciting an acceptance of a wager from another player in response to receiving information about the wager and the other player. Soliciting may include providing an interface such as that of FIG. 5 through which the other player may accept or decline the challenge. Soliciting may include presenting any information in any manner as desired.

As indicated at block 107, some examples may include receiving an acceptance of the wager from the other player (e.g., from a mobile device in response to a player clicking a confirm button). In some examples, in response to an acceptant of a challenge, a wager of the amount of points may be formed between the challenged and challenging player as indicated at block 109. Forming a wager may include entering information into a database, notifying players, auditing actions, recording actions, forming a binding agreement, enforcing a binding agreement, adjusting points, and so on.

Some example may include receiving a rejection of a wager from the other player. In such a situation, no wager may be formed based on the challenge, points maybe returned to a player, and so on as desired.

It should be recognized that any number of players may be challenged simultaneously, and or in sequence in any manner as desired. For example, a player may enter one or more challenges before one or more other challenges have been accepted or declined. As another example, a player may choose multiple players as an opponent for a wager defined by other parameters and a challenge may be sent to all of those selected opponents.

In some examples, various parameters of a wager may be selected by a house and/or defined by a player in any combination as desired. For example, a house may set odds for a wager even between two players. In other examples one or the other of the players may set such odds and/or other parameters.

Wager Formation Examples

In some examples, in response to submitting information about a wager (e.g., a wager against a house and/or a challenge) an amount of wagered points may be subtracted from a player's point total. In other examples, such points may be subtracted in response to a formation of a wager and/or a loss of a wager instead. For example, a challenging player may have the points in a challenge removed in response to a challenged player accepting a challenge. In some examples, a challenged player may have points reduced in a challenged amount in response to accepting the challenge. If the challenged player declines a challenge, points may be returned to a challenging player if they were removed upon the challenge being made.

In some examples, a player may only wager points that are in their account. For example, a player may only send out and/or enter into challenges so that their point total does not get reduced to less than zero. For example, if a player has 1000 points in an account, the player may be prevented from placing a wager, accepting a challenge, and so on for an amount of points greater than 1000. In some examples, a player may not send out challenges that total more than the total points in their account. In some examples, they may send those challenges out, but challenges may not be accepted for more than that amount. For example, challenges may be canceled if others are accepted, or other wagers are entered into that reduce the points available to below the needed to enter into the challenge. Such cancelation may not apply in situations where the wagered amount is removed upon issuing a challenge rather than when a challenge is accepted.

Information about the wager maybe entered into a database so that it may be used for future outcome or information determination. For example, a database may store data about the wagers that may be viewed by a player in the future before and/or after a wager is resolved. The information may be used to resolve a wager (e.g., the information may identify which player or house is on which side of the wager, how many points are wagered, an event that the wager is based on, and so on).

Cost of Wagering Examples

In some examples, point wagering may be free and/or covered by some subscription cost. For example, a player may be able to enter into any number of wagers upon paying a monthly fee and/or signing up for a service with no cost per wager.

In some examples, one or more point wagering options may be tied to some cost. For example, in some examples, a player may be required to pay some cost to enter into a wager. A cost may include a cost of points and/or a cost of money.

In one example, a player may pay for wagers with tokens. Tokens may represent actual cash. A player may purchase tokens for money. For example—$0.99 to buy 100 tokens, $2.99 to buy 500 tokens, $4.99 to buy 1000 tokens. In some examples, rather than tokens, actual cash may be used.

Each wager by the player may cost some number of tokens. A wager against the house may cost the player more or less than a challenge. A challenge may cost all players involved in the challenge the amount of tokens. The amount may be more or less for a challenged than a challenger. An amount of a wager may affect points so that larger wagers may cost more tokens. In some examples, a wager type may affect the cost (e.g., a parlay wager may be more expensive than a standard wager). In some examples, a losing player may pay for the wager rather than both people being charged.

In some examples, points used as a basis for a wager may be used to pay for a wager. For example, there may be some conversion mechanism from points to tokens. As another example, actual point may be used instead of tokens or cash. Points may be purchased for cash in some examples.

In response to receiving information about a wager and/or forming a wager, a balance of tokens and/or other elements may be adjusted as a cost of placing the wager. Such an adjustment may include adjusting a database entry in which a balance is maintained.

Wager Outcome Examples

In various examples, a wager may be based on any desired event. For example, a wager may include an in running wager (a wager made during an event), a pre-game wager, a wager based on an outcome of an event, a wager based on a happening within an event (e.g., a card being drawn, a run being scored, a ball being hit), a sporting event, a video game, a political event, a casino game, and so on.

In some examples, a gaming server may obtain information about upcoming events, process that information, present wagering options related to those events, and form wagers that are based on those events. In some examples, a gaming server may receive information from which the outcomes of events and/or wagers based on the events may be determined. For example, such information may include the outcomes of events, happenings in a game, a data stream of occurrences in an event, and so on. In response to receiving such information, a gaming server may determine wager outcomes for wagers that are based on the information. For example, information may identify that team X won a game on which 25 wagers are based. A database may be referenced to find all wagers based on the game and the wagers may be resolved based on team X winning (e.g., people that bet on team X may be winners and those that bet against team X may be losers).

As indicated at block 111, some examples may include adjusting a point total for a player based on an outcome of a wager. For example, a winning player may have his point total increase in response to winning a wager. The amount of the increase may be based on an odds of the wager and an amount wagered. A database may be adjusted to maintain the balance of points in response to a determination of an outcome of a wager.

Group, Competition, and/or Leaderboard Examples

In some examples, players may want to earn points to show their prowess in gaming. A leaderboard may be maintained and/or published so that well performing players may receive public recognition of their performance. A leaderboard may be a board that references a particular time (e.g., last week, moving period of months, a particular month) and/or group (e.g., social network of a person) and/or an all-time board. For example, weekly and/or daily leader board may be maintained and/or published. In some examples, a leaderboard maybe based on a social network. For example, a leaderboard may show friends and/or members of a social network that have a leading point total. Accordingly, each player may be shown a different leaderboard that is based on that specific player's social network or friends. A gaming server may determine a social network and/or a leader board based on stored information about players and/or those players wagering activities (e.g., a player social network may be determined, players in that social network may have their point totals determined, those players may be ranked based on their point totals, and the outcome in order may be shown to the player).

Some examples may include a jackpot and/or tournament that may relate to points earned. For example, a tournament over a week may take place and earn the winner or person that earned the most point or ended with the most points at the end of the week with a jackpot. A leader of a leaderboard may be awarded in response to leading the leaderboard at some end point.

Cantor 5/7 and/or Fantasy Examples

Some examples may include fantasy event wagering between a house and a player or between/among players.

In some examples, a player may identify a team and issue a fantasy challenge based on that team to another player. A gaming server may receive the information identifying the team and the other player and an amount of points and issue the challenge to the other player in response.

In some examples, the other player may be presented with an interface that allows selection of an opposing team to enter the challenge. The other player may identify his team and may accept the challenge (or may decline the challenge). A gaming server may receive an acceptance and/or an indication of a team from the other player. In response, the gaming server may determine odds and/or other parameters for the wager and form the wager with those odds or other parameters. The odd maybe determined based on expected performance of the two teams based on historical performance of the members of the teams. Accordingly, the challenging player may be entering into a sort of blind wager without knowing in the odds but can be confident that the house will make fair odds based on its track record of odds setting. In other examples, the challenging player may be able to confirm or deny a wager after the odds are determined so that a wager is formed in response to the challenging player confirming the challenge after the other player selects his team and the odds are set.

Outcome of the fantasy wager may be determined based on actual events in actual games that may be converted to points in the fantasy game. For example, for each hit in a real baseball game that a member of one player's fantasy team, the player may be granted a fantasy point. The player with the most fantasy points may win the fantasy challenge. It should be recognized that any manner of scoring a fantasy wager may be used.

In another example, a racing daily fantasy game may be employed. Such a racing daily fantasy game may include, but not limited to, horse racing or car racing. In one example, a real-time feed of odds data may be received via a device from different racetracks prior to a race. By way of example, a daily fantasy horse racing game may permit a user to select a team of horses across various horse races. Assuming a track's typical eight race card, a user may select eight horses.

In one example, a horse racing fantasy application may permit a user to make a first selection of race participants such that each race participant in the first selection is most favored to win a respective race. In a more specific example, a horse racing fantasy application may permit a user to select two horses that are favorites in their respective race. A user may use a mobile device to make a second selection of race participants whose odds of winning are above a threshold but are not most favored to win. For example, a daily horse racing fantasy game may permit a user to selects three horses that are over 8-1 odds. Finally, a user may be permitted to make a third selection of race participants whose odds of winning are below a threshold, such as selecting three horses that are under 8-1 odds. Furthermore, a user may be permitted to make a fourth selection comprising a race participant (e.g., a horse) that the user deems to be the best bet to win a respective race out of all the selections made by the user. This best bet selection may add bonus points to the game if that race participant wins but may also cost the player points if the race participant loses.

In another example, points in a racing daily fantasy game may be awarded as follows: Each winner may be awarded three points, each selection that finishes second may be awarded two points, and a third-place finish may be worth a point. However, it is understood that the points can be awarded in a variety of ways and that the point allocation discussed herein is merely illustrative.

Below is a working example of three horse races. In this example, the selected horses are in bold. In "Race 1," horse number 7 "Snacks" is an under 8-1 selection; in "Race 2" and "Race 3," the respective selections are horse 4 "Call Me Sir" and horse 3 "Hockey Puck," which are the favorites in their respective races. Furthermore, in Race 3, Hockey Puck is selected as a best bet.

RACE 1
1 Leap Year 4-1
2 Billy the Kid 2-1
3 Phantom Call 8-1
4 Dance Team 20-1
5 Groovy 10-1
6 Markim Missy 5-1
7 Snacks 15-1
8 Diamond Joe 6-1

RACE 2
1 Fred Flint 20-1
2 Archie 3-1
3 Snowball Fight 10-1
4 Call Me Sir 1-1
5 Tax Time 8-1
6 Busy Signal 15-1
7 Wild Pitch 5-1
8 Favorite Son 4-1
9 Ice Cream Truck 12-1

RACE 3
1 Sonny Boy 8-1
2 Big Tony 5-1
3 Hockey Puck 3-2 BB
4 Boxing Champ 12-1
5 Candy Bar 6-1
6 Fast Lane 30-1
7 Too Fast 4-1
8 Cagey Max 15-1

As noted above in FIG. 5, a user may challenge another user. Thus, once a user has formed a fantasy racing team the user may challenge a fantasy racing team of another user with an interface like that of FIG. 5. The fantasy racing team with more points after the conclusion of the actual races may win the challenge. In another example, the fantasy racing game may be played based on races that occurred in the past. Thus, the results could be viewed from pre-recorded races.

Monetary Wagering Examples

Some examples may include monetary wagering. Wagering may take one or more forms that may be similar to points wagering (e.g., wagering on games, risking money for more money, wagering against a house, wagering based on challenges to other players, etc.). Rather than points, money may be used. Such money may be stored in an account (e.g., similar to points being stored). Wagering with money may or may not include a cost for placing a wager (e.g., use of token).

In some examples, a player may choose to use points or money to place wagers. Such a choice may be made based on an account that a user signs in with (e.g., a points account vs a money account), a location, a selection of an account from which to wager, and so on. A player may switch back and forth between point or monetary wagering as desired in some examples. A single or multiple different applications (e.g., software on a device) may be operated to facilitate such wagering (e.g., one application for both types of wagering, a different application for each type of wagering). A single or multiple gaming servers may be used for both types of wagering (e.g., a single gaming server that can do both, a different server for each type).

Monetary wagering may be restricted based on any desired legal requirements. For example, monetary wagering may be limited to house wagering, location limitations, age limitations, wager type limitations, and so on.

It should be recognized that wagering with money may take any form that may be similar or different than wagering with points. Outcomes of monetary wagers may be determined, and monetary accounts may be adjusted accordingly.

Location Examples

Some examples may include enabling, disable, and/or switching functionality based on a location of a player and/or device. For example, monetary wagering may be disabled in certain locations, points wagering may be disabled in certain locations, and so on.

Some examples may include determining a location of a play errand/or device being used to wager or access a gaming service. For example, a mobile device may have a location determined using geofencing, gps, triangulation, and so on. Such a determination may take place periodically, in response to a login, wager, and/or other event.

A determination of functionality that should be allowed, disallowed, switched to, and so on may be made based on the determined location. For example, a table of locations and functionalities and/or action that are allowed and/or should be taken when a device is in the location may be maintained and referenced in response to a location determination. In response to such a determination, an action may be taken, a function maybe disallowed, function may be allowed, and so on by a gaming server and/or device accessing the gaming server.

In one example, a player's device may include an interface that may be changed from allowing points wagering and not monetary wagering to allowing monetary wagering but not points wagering in response to a location determination. Such a location determination may include a determination that a player is in a casino, in a jurisdiction where monetary wagering is legal, and so on. Points wagering may not be allowed in such a jurisdiction or may be depending on the desire of a gaming service operator. When a player leaves such an area and a determination is made that the player is not in that location, the player may have an interface changed to allow points wagering but not monetary wagering. Such a switch may change a default in some examples (e.g., a switch from points to money wagering as a default bet but may still allow the other type of wagering). In some examples, a single application may switch which account wagering is occurring from seamlessly as the user changes locations. Such changing may allow a user to conveniently use a gaming service form multiple locations that may have different laws or preferences.

Penalty As Rewards Examples

Some examples may include wagering for an ability to impose a penalty. Such wagering may be similar to point wagering against another player. For example, a player may challenge another player to a wager with the winner being able to impose some penalty on the loser (e.g., an identified penalty at the wagering time in lieu of points, a penalty that can be traded for points, and so on).

Some examples may include a piece of software that imposes a penalty on a player. For example, a background application may run on an Android device. The background application may communicate with a wagering application to receive penalty information and impose those penalties through the device (e.g., change a ring tone, accessing an operating system API).

Imposing a penalty may include controlling a computing device, such as a mobile phone, to operate in a manner differently than desired by a player. For example, in some examples a penalty may include a ring tone change, a background change, wager options changing, website options changing, screen names changing, avatar changes, quotes being added to a profile, friends being removed or added from a social network, control over statuses on Facebook or some other website, blocking of a website or other internet resource, redirecting traffic to a website, volume adjustment, locking or making a device unavailable, changing a voicemail message or functionality, text messaging block out or auto responses, any control of any aspect as desired.

Some examples may include an interface similar to a points wagering interface where a user may identify wagering parameters to issue a challenge. One wagering parameter may include selecting a penalty from a set of possible penalties. The parameters may be identified to a challenged player. Selecting a penalty may include selecting a time frame for the penalty to be imposed (e.g., a ring tone for 5 days, a ring tone for 5 calls, etc.) and/or a standard set of time frames may be used.

In some examples, players may pick the penalty by spending points. (e.g., wager of 100 points win 100 points get to choose to buy a penalty up to that cost). An amount of time may be based on a cost of the penalty.

In some examples, rather than and/or in addition to a penalty, a benefit may be gained for a challenging player. Such a benefit may include, for example, stealing friends, gaining use of an account, gaining rights to a music file or movie or other media or software, gaining access to a membership, and so on. Some examples may include wagering to remove a penalty. For example, a challenge may be issued for the removal of a penalty vs a second penalty (e.g., a double or nothing penalty wager). As another example, a penalty for Player A to impose a ring tone penalty on Player B may be overcome by a penalty being awarded by Player B to impose a ring tone penalty on Player A.

Some examples may include queuing penalties that would override one another. For example, a ringtone penalty may be imposed on Player A and then if a second penalty for ringtone control is made on Player A, that second penalty may be queued until after the first penalty expires and/or is otherwise removed. In some examples, a later penalty may override an earlier penalty. In some examples, a wage may not be entered into that would impose an overriding penalty (e.g., a challenge may not be issued or accepted that would do so). Some examples may include determining penalty availability and/or queuing based on prior imposed penalties (e.g., by a gaming server, by a penalty imposing application on a device). Such information may be presented, and/or used to influence a presentation of information and/or to impose one or more penalties.

Some examples may include imposing a penalty in response to the outcome of a wager. For example, a gaming sever may identify the outcome of the wager and/or the penalty to a device and in response a penalty application may impose the penalty. Some examples may include allowing a challenged and/or challenging player to select when to impose the penalty. Some examples may include imposing the penalty in response to another overriding penalty ending (e.g., a penalty period for a similar penalty ending).

Example Structures

Figure 6:
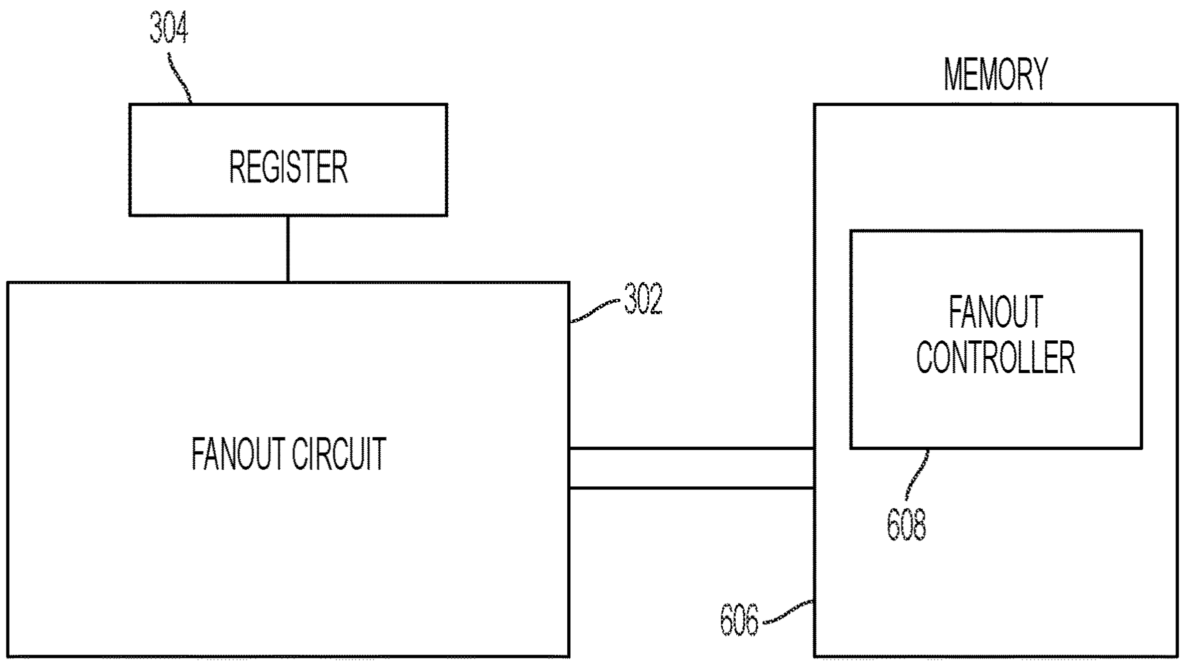
FIG. 6 shows an example apparatus in accordance with aspects of the instant application.

FIG. 6 illustrates an example structure that may be used in some examples. As indicated, some examples may include a gaming server 601, a first mobile device 603, a second mobile device 605, a location service 607, and a communication network 609. A gaming server may perform a method to enable gaming functionality as described herein. A mobile device may operate one or more applications to facilitate gaming services as described herein. A location service may determine location information to facilitate gaming services as described herein. One or more elements may communicate with one another through a communication network.

It should be recognized that various examples may include different, fewer, more, alternative, same, differently ordered, and so on elements and/or functionality. Various examples may be used in any combination as desired and/or along with other elements or functionality as desired. It should be recognized that various examples are given as non-limiting examples only.

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some examples, hard-wired circuitry or custom hardware may be used in place of, or in combination with, some or all of the software instructions that can implement the processes of various examples. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, examples of an apparatus include a computer/computing device operable to perform some (but not necessarily all) of the described process.

Likewise, just as the description of various steps in a process does not indicate that all the described steps are required, examples of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various examples can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an example, a server computer or centralized authority may not be necessary or desirable. For example, the present invention may, in an example, be practiced on one or more devices without a central authority. In such an example, any functions described herein as performed by the server computer or data described as stored on the server computer may instead be performed by or stored on one or more such devices.

Where a process is described, in an example the process may operate without any user intervention. In another example, the process includes some human intervention (e.g., a step is performed by or with the assistance of a human).

Numerous references to a particular example do not indicate a disclaimer or disavowal of additional, different examples, and similarly references to the description of examples which all include a particular feature do not indicate a disclaimer or disavowal of examples which do not include that particular feature. A clear disclaimer or disavowal in the present application shall be prefaced by the phrase "does not include" or by the phrase "cannot perform".

In some examples, there is a plurality of player units 40-1 to 40-*n* which are coupled via a communication system 41, such as the Internet, with a game playing system comprising an administration unit 42, a player register 43, and a game unit 45. Each unit 40 is typically a personal computer with a display unit and control means (a keyboard and a mouse).

When a player logs on to the game playing system, their unit 40 identifies itself to the administration unit. The system holds the details of the players in the register 43, which contains separate player register units 44-1 to 44-*n* for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40 and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

The invention claimed is:

1. A method comprising:

determining, by a computing device, that a mobile device associated with a first player is located in a first location that is designated as a non-monetary, points only wagering area;

in response to determining that the mobile device is located in the first location, automatically enabling, by the computing device, points wagering and automatically disabling, by the computing device, monetary wagering from the mobile device while the mobile device remains in the first location;

receiving, by the computing device from the mobile device, a first selection of race participants such that each race participant in the first selection is most favored to win a respective race;

receiving, by the computing device from the mobile device, a second selection of race participants whose odds of winning are above a threshold but are not most favored to win;

receiving, by the computing device from the mobile device, a third selection of race participants whose odds of winning are below the threshold;

forming, by the computing device, a first fantasy racing team for the first player comprising race participants from the first selection, the second selection, and the third selection;

receiving, by the computing device from the mobile device, a challenge by the first fantasy racing team of the first player, in which the challenge identifies an amount of points selected by the first player and a second fantasy team selected by the first player against whom to place the challenge;

in response to receiving the challenge, identifying, by the computing device, the challenge to a second player associated with the second fantasy team;

receiving, by the computing device, an acceptance of the challenge from the second player;

in response to receiving the acceptance, forming, by the computing device, a wager between the first fantasy racing team of the first player and a second fantasy racing team of the second player based on the challenge;

adjusting, by the computing device, points in an account of a winning player of the challenge in response to determining an outcome of the challenge;

determining, by the computing device, that the mobile device is located in a second location that is designated as a monetary wagering area; and in response to determining that the mobile device is located in the second location;

automatically enabling, by the computing device, said monetary wagering and automatically disabling, by the computing device, said points wagering from the mobile device while the mobile device remains in the second location; and receiving, by the computing device from the mobile device, a fourth selection of one race participant designated by the first player as most likely to win one or more selections by the first player.

2. The method of claim 1, further comprising:

receiving, by the computing device from the mobile device, a second challenge by the first player, in which the second challenge identifies a penalty and the second player against whom to place the challenge, in which the penalty is neither a monetary penalty nor a point-based penalty;

in response to receiving the second challenge, identifying, by the computing device, the second challenge to the second player;

receiving, by the computing device, a second acceptance of the second challenge from the second player;

in response to receiving the second acceptance, forming, by the computing device;

a second wager between the first player and the second player based on the second challenge; and imposing, by the computing device, the penalty on a losing player of the second challenge in response to determining a second outcome of the second challenge.

3. The method of claim 2, wherein the penalty affects an operation of a mobile device belonging to the losing player.

4. The method of claim 2, wherein the penalty includes a change to a ring tone on a telephone of the losing player.

5. The method of claim 2, wherein the penalty includes a change in a background image of a computing device of the losing player.

6. The method of claim 2, wherein the penalty includes a change to a social network of the losing player.

7. The method of claim 2, wherein the penalty includes a restriction on internet traffic of a computing device of the losing player.

8. The method of claim 2, wherein the penalty includes a change to a voicemail of the losing player.

9. The method of claim 2, wherein the second challenge identifies a time period during which the penalty is to be imposed, and wherein imposing the penalty on the losing player includes imposing the penalty for the time period.

10. The method of claim 2, wherein imposing the penalty on the losing player includes queuing the penalty for imposition until a previously imposed penalty imposed on the losing player has expired.

11. The method of claim 2, wherein the second challenge identifies a benefit that is neither a monetary benefit nor a point based benefit; and the method further comprises imparting the benefit on the winning player of the second challenge in response to determining the second outcome of the second challenge.

12. The method of claim 11, wherein the benefit affects an operation of a computing device of the winning player.

13. The method of claim 11, wherein the benefit includes removing a previously imposed penalty from a computing device of the winning player.

14. The method of claim 11, wherein the benefit includes access to media.

15. The method of claim 1, wherein the fourth selection of one race participant designated by the first player is a participant most likely to win of all selections by the first player.

16. An apparatus comprising:

a memory;

at least one processor to:

determine that a mobile device associated with a first player is located in a first location that is designated as a non-monetary, points only wagering area;

in response to determining that the mobile device is located in the first location, automatically enable points wagering and automatically disabling monetary wagering from the mobile device while the mobile device remains in the first location;

receive, from the mobile device, a first selection of race participants such that each race participant in the first selection is most favored to win a respective race;

receive, from the mobile device, a second selection of race participants whose odds of winning are above a threshold but are not most favored to win;

receive, from the mobile device, a third selection of race participants whose odds of winning are below the threshold;

form a first fantasy racing team for the first player comprising race participants from the first selection, the second selection, and the third selection;

receive, from the mobile device, a challenge by the first fantasy racing team of the first player, in which the challenge identifies an amount of points selected by the first player and a second fantasy racing team selected by the first player against whom to place the challenge;

in response to receiving the challenge, identify the challenge to a second player associated with the second fantasy racing team;

receive an acceptance of the challenge from the second player;

in response to receiving the acceptance, form a wager between the first player and the second player based on the challenge;

adjust points in an account of a winning player of the challenge in response to determining an outcome of the challenge;

determine mobile device is located in a second location that is designated as a monetary wagering area;

in response to determining that the mobile device is located in the second location, automatically enable monetary wagering and automatically disable points wagering from the mobile device while the mobile device remains in the second location, wherein the second location is geographically different from the first location; and wherein the at least one processor is further configured to receive, from the mobile device, a fourth selection of one race participant designated by the first player as most likely to win one or more selections by the first player.

17. The apparatus of claim 16, wherein the at least one processor is further configured to:

receive from the mobile device a second challenge by the first player, in which the second challenge identifies a penalty and the second player against whom to place the challenge, in which the penalty is neither a monetary penalty nor a point-based penalty;

in response to receiving the second challenge, identify the second challenge to the second player;

receive a second acceptance of the second challenge from the second player;

in response to receiving the second acceptance, form a second wager between the first player and the second player based on the second challenge; and impose the penalty on a losing player of the second challenge in response to determining a second outcome of the second challenge.

18. The apparatus of claim 17, wherein the penalty affects an operation of a mobile device of the losing player.

* * * * *